Nov. 3, 1953     C. F. JONES     2,657,615
SLOTTING MACHINE

Filed July 21, 1950     4 Sheets-Sheet 1

INVENTOR.
Cerny W. F. Jones,
BY
Davis, Lindsey, Hibben & Noyes
Attys.

Patented Nov. 3, 1953

2,657,615

UNITED STATES PATENT OFFICE 2,657,615

SLOTTING MACHINE

Cernyw F. Jones, Economy, Ind., assignor to Perfect Circle Corporation, Hagerstown, Ind., a corporation of Indiana Application July 21, 1950, Serial No. 175,267

20 Claims. (Cl. 90—11)

The invention relates generally to machines for cutting slots and more particularly to a machine for cutting slots in cylindrical articles such as piston rings for internal combustion engines or the like.

One well-known form of piston ring comprises a ring member substantially rectangular in radial cross section with a circumferentially extending groove in the outer periphery and with a series of circumferentially spaced radial slots extending through the ring. Each slot is relatively narrow in a direction axially of the ring but usually is elongated circumferentially. Such slots are ordinarily formed by means of a circular cutter positioned in the midplane of the ring and fed radially inward of the ring from the outer periphery thereof. Because a cutter of relatively small diameter is necessary to cut slots of the desired size, the circumferential ends of each slot are of arcuate shape, curving toward each other inwardly of the ring. Such a slot is relatively long circumferentially at the outer periphery of the ring and is necessarily substantially shorter at the inner periphery, and if the slots are to have sufficient opening at the inner periphery, they will be quite long at the outer periphery and therefore relatively few slots may be cut in the ring.

The general object of the invention is to provide a slotting machine capable of cutting slots with ends approaching a position parallel to each other or nearly so, rather than the arcuate form of ends obtained by the ordinary circular cutter.

Another object is to provide a slotting machine for cutting slots in cylindrical members such as piston rings, with the ends of the slots of such shape that the angular extent of each slot at the outer periphery is substantially the same as the inner periphery.

A further object is to provide a slotting machine for cutting slots in cylindrical members such as piston rings, by means of which shorter slots with sufficient opening at the inner periphery of the ring may be obtained than has heretofore been possible with previous forms of slotting machines.

Still another object is to provide a slotting machine of the foregoing character, in which a cutter having an arcuate series of teeth generally similar to a portion of an ordinary milling cutter is used but with the teeth adapted to be arranged on a much smaller radius than in the case of the conventional cutter, and which includes means for imparting a novel cutting movement to the cutter.

A still further object is to provide a novel slotting machine of the foregoing character, by which a uniformly spaced series of slots may be cut in the work piece and which may accommodate work pieces of different diameters and with a different number of slots to be cut in them.

Other objects and advantages will become apparent from the following description taken in connection with the accompanying drawings, in which.

Figures 1, 2, 3, 4:
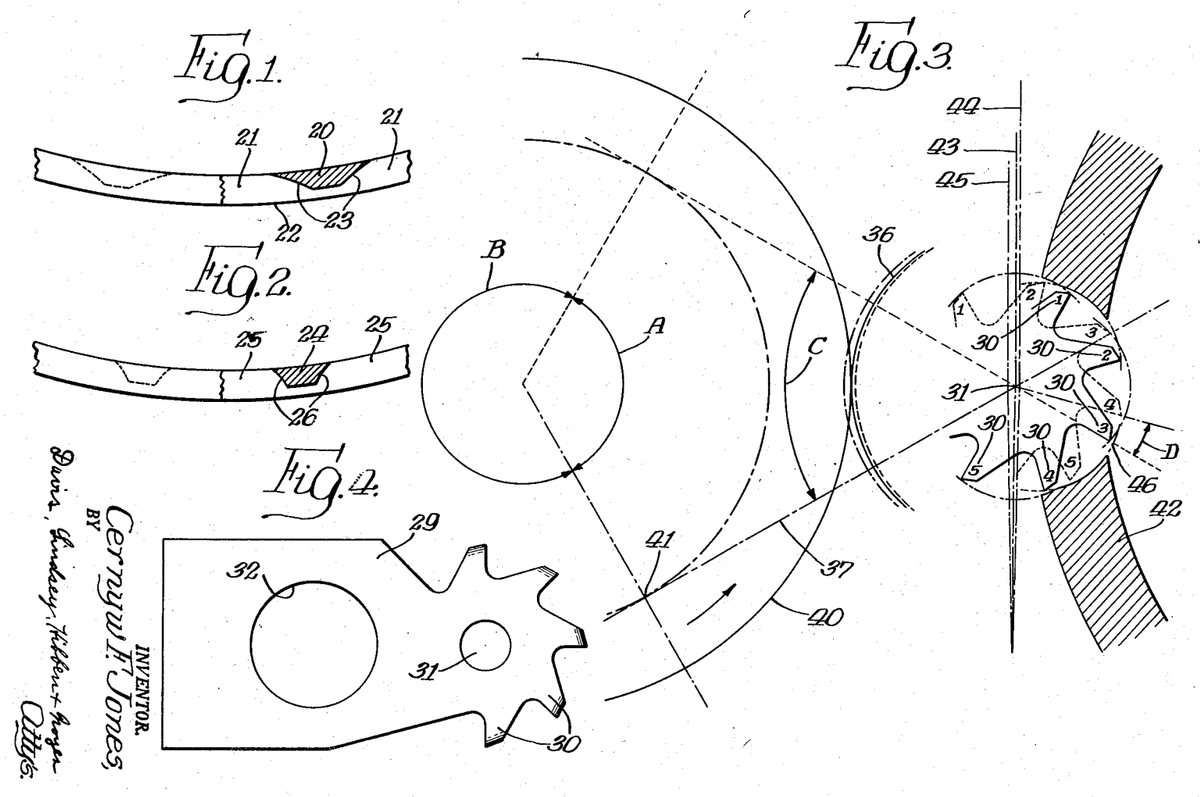
Figure 1 is a fragmentary plan view of a piston ring of the type herein contemplated, and showing the form of slots as heretofore made.
Fig. 2 is a view similar to Fig. 1 but showing the form of slots capable of being made by a slotting machine embodying the features of the invention.
Fig. 3 is a diagrammatic view illustrating the manner in which slots are cut by the present slotting machine.
Fig. 4 is an enlarged elevational view of a cutter employed in the present slotting machine.

As heretofore mentioned, the slotting of piston rings of the type disclosed has usually been performed by means of a circular cutter positioned in the mid-plane of the ring and fed radially inward of the ring starting at the outer periphery thereof, the cut terminating when the cutter has broken through the inner periphery of the ring to the desired extent. A ring of this type is shown in Fig. 1, and it will be noted that such slotting will leave intervening wall portions 20 between the ends of slots 21 with the cylinder-engaging rail portions 22 left on opposite sides of each slot. The ends of the slots defining the intervening wall portions 20 are arcuate in form, as indicated at 23, and obviously are of a curvature conforming to the curvature of the cutter.

It will be noted that with slots of this form, the opening at the inner periphery of the ring is substantially less than the opening at the outer periphery of the ring, and that, if the opening at the inner periphery of the ring is of any substantial size, the opening at the outer periphery is much longer circumferentially of the ring so that relatively few slots of this character may be cut in a ring. This tends to weaken the ring since the rail portions 22 are supported by relatively few intervening wall portions 20 and the ring, if overloaded, will tend to break through the wall portions 22 at one of the slots. Moreover, because of the excessive length of the slots, there is a tendency for the ring to flatten in the rail portions at the slots when the ring is confined in the cylinder because of the length of such rail portion and because the bending of the ring is confined to relatively few such rail portions.

A slotting machine embodying the features of the invention is capable of cutting slots having ends which approach parallelism, or at least positions radial of the ring, so that the angular extent of the slot at the outer periphery is not substantially greater than the angular extent of the slot at the inner periphery. In Fig. 2, there is illustrated a ring of this type, in which there is shown an intervening wall portion 24 between a pair of slots 25. It will be noted that in this form of slotting, the ends of the slots, indicated at 26, while somewhat arcuate, are placed closer to a radius of the ring than is shown in the form illustrated in Fig. 1, so that the opening of each slot at the outer periphery is only slightly greater than the opening of the slot at the inner periphery. This provides several advantages since, for a given amount of opening at the inner periphery, each slot may be substantially shorter than has heretofore been possible, and an increased number of slots may be placed in any ring. Furthermore, the rail portions at the upper and lower sides of each slot are shorter. This results in a stronger ring with the rail portions less likely to break and increases the spring load of the ring. The ring as a whole is thus stiffer to resist bending. Moreover, with the increased number of slots in a ring of a given size, the bending of the rails at the sides of each slot will be decreased so that less distortion and flatness occur in the ring as a whole.

In Fig. 3 of the drawings, I have illustrated diagrammatically how slots of the character illustrated at 25 in Fig. 2 are cut, the cutter employed for this purpose being illustrated in Fig. 4. The cutter, indicated generally at 29, is of elongated form and at one end thereof is a series of teeth 30 arranged in an arc about an axis, indicated at 31, located adjacent that end of the cutter. The teeth 30 are similar to those of a conventional cutter but, since no arbor extends through the cutter on the axis 31, the radius of the teeth from this axis may be much smaller than in the case of the conventional cutter. The teeth are shown as being adapted for cutting when the cutter is rotatively moved about the axis 31 in only one direction, in this instance a clockwise direction, as is apparent from the shape of the teeth. To accomplish the cutting action with this form of cutter, the machine is constructed to provide both rotative or rocking movement of the cutter about the axis 31 and, simultaneously therewith, to reciprocate the cuter longitudinally, that is, in a direction perpendicular to the axis 31. To accomplish such movement, the cutter is supported in such a manner that it may be rocked about its axis 31 and at the same time reciprocated, the cutter suport being adapted to be actuated in this manner by a rotatably driven combined cam and crank means.

To accomplish such cutting movement the cutter 29 is provided with an aperture 32 adjacent its other end, which is mounted and clamped on a pin 33 (see Figs. 5 and 6) carried on an offset portion 34 of a tool post 35. The offset portion 34 is formed on one end of the tool post 35, and on the opposite end thereof is mounted a roller 36 as well as a lever 37. The combined cam and crank means cooperates with the roller 36 and lever 37 to impart the desired movement to the cutter. Thus, there is provided a cam member or disk 40 having a peripheral cam surface adapted to engage the roller 36 to impart reciprocating movement to the tool post 35 and thus to the cutting tool 29. The cam member 40 also has a crank pin 41 mounted on one face thereof and cooperating with the lever 37 to rock the tool post 35. The tool post 35 is mounted so that such rocking movement is on the axis 31 about which the teeth 30 are formed.

Referring again to Fig. 3, where the cutting action is diagrammatically illustrated, it will be noted that upon rotation of the cam disk 40 in a counterclockwise direction, as illustrated in Fig. 3, the crank pin 41 and the lever 37 cause the latter to rock the tool post and consequently the cutter in a clockwise direction while the cam is moving through the angle indicated at A. This rocking movement obviously causes the teeth of the cutter to swing in a clockwise direction and to effect a cutting action on the ring, indicated at 42 in Fig. 3. During the remainder of each revolution of the cam disk 40 and the crank pin 41, that is, while the crank disk is moving through the angle indicated by B, the cutter will be rocked in the opposite direction but through the same angle. Thus, the cutting tool is first rocked, through an angle indicated at C, in a clockwise direction to perform a cutting stroke and then is reversely rocked in a counterclockwise direction through the same angle C on a return stroke. In the illustrated embodiment of the invention, the dimensions of the various parts are such that the angle A is 120° and the angle B is consequently 240°, and the angle C, representing the angular rocking movement of the cutter, is 60°.

Simultaneously with such rocking movement of the cutter, the cam surface on the cam member 40, cooperating with the roller 36 on the tool post, produces a reciprocating movement of the cutter bodily toward and from the work. Such reciprocating movement is relatively slight and preferably only a few thousandths of an inch. This reciprocating movement, of course, occurs at the same time that the cutter is being rocked, since the reciprocating movement results from the shape of the cam surface on the cam 40, and the crank pin 41 is carried by this same cam member. The cam surface is arranged so that the cutter is moved from a more or less central position, indicated by the line 43, toward the work to a position indicated by the line 44, and thence back to the central position 43, while the cutting teeth are rocked in a clockwise direction to perform a cutting stroke. Thus, the cutting teeth will clear the work at the end of the cutting stroke. During the counterclockwise movement of the cutter, the cam member 40 effects movement of the cutter from the central position, indicated at 43, away from the work to a maximum withdrawn position, indicated by the line 45, and thence back to the central position 43 so that during the return stroke of the cutter, when it is moving in a counterclockwise direction, the teeth are entirely clear of any cutting engagement with the work.

To insure further clearance of the teeth at the end of the cutting stroke, the angular spacing of the teeth is less than the angular movement during the cutting stroke so that there is an overlap of the path of travel of adjacent teeth, as indicated by the angle D. In the preferred construction, where the cutter is moved through an angle of 60° during the cutting stroke, the teeth in the cutter are preferably spaced substantially 45° apart so that there is an overlap of 15°, as indicated by the angle D. The clearance effected thereby is indicated in Fig. 3 of the drawing at 46 and the overlap insures having the cutting point of each tooth clear the cut made by the tooth ahead of it. To facilitate an understanding of the movement of the cutter, the teeth of the cutter have been numbered, and their initial position is shown in dotted lines and their final position in full lines.

From the foregoing, it will be apparent that the cutting action is effected by causing the cutter to rock in a clockwise direction about the axis of the teeth and at the same time move inwardly of the work and then outwardly so that the teeth dig into the work to effect a cut and are moved clear thereof before being returned to their initial position for making a second cut. The machine also includes means for gradually feeding the cutter into the work, as will hereinafter be described, so that cuts of any desired depth may be effected. The reciprocation of the cutter heretofore referred to is effected in the preferred embodiment of the machine by a swinging movement rather than strict linear reciprocation, as hereinafter described. However, because such reciprocation is only a few thousandths of an inch in extent and the radius of swinging is relatively great, any curvature due to such swinging movement is entirely negligible and the movement thus may be considered reciprocatory. In the case of cutting slots in a piston ring, the feeding movement as hereinafter described is carried on to a sufficient extent to cause the teeth to break through the inner periphery of the ring and form a slot of the desired circumferential length in the ring. The invention, however, is obviously not limited to cutting slots in piston rings but may be used for cutting slots in other forms of work pieces.

The machine for performing such cutting action is illustrated in Figs. 6 to 9, inclusive, and has a frame structure including a main frame preferably comprising a base 50 having flange portions 51 at two of its sides, by which it may be bolted to a bench or the like. Mounted on the base is a main frame of box-like construction and comprising a front wall 52 and a rear wall 53 of relatively heavy construction. The walls 52 and 53 are connected at their ends by end walls 54 and at their upper edges by a top wall 55. The walls 52 and 53 are preferably held in spaced relation to each other by bolts 58 threaded into spacing members 59 located at the four corners of the walls. The work piece, which is here illustrated in the form of a piston ring 56, is carried on a work support, here indicated generally at 57, mounted on the front wall 52. The work support 57 comprises a slide 60 mounted for linear adjustment on the front face of the front wall 52 and adapted to be clamped thereto by a clamping bolt 61 (see Figs. 5 and 6) threaded into the slide 60 and extending rearwardly through a slot 62 in the front wall and a slot 63 in the rear wall. Mounted on the clamping bolt at the rear face of the front wall 52 is a bridge piece 64 adapted to be clamped against such rear face by an elongated sleeve 65 mounted on the clamping bolt and secured thereon by a nut 66 on the rear end of the bolt. The clamping bolt 61 and sleeve 65 are of elongated form, so that they may extend to the rear of the rear wall 53, and the nut 66 is thus readily accessible for tightening when the slide 60 is moved to an adjusted position. To effect linear adjustment of the slide 60, a hand screw 67 is rotatably mounted in the right-hand end thereof and is threaded in a nut 70 bolted to the right-hand edge of the front wall 52. Thus, when the nut 66 on the clamping bolt 61 is released, the hand screw may be turned to adjust the slide 60 longitudinally.

Figure 6:
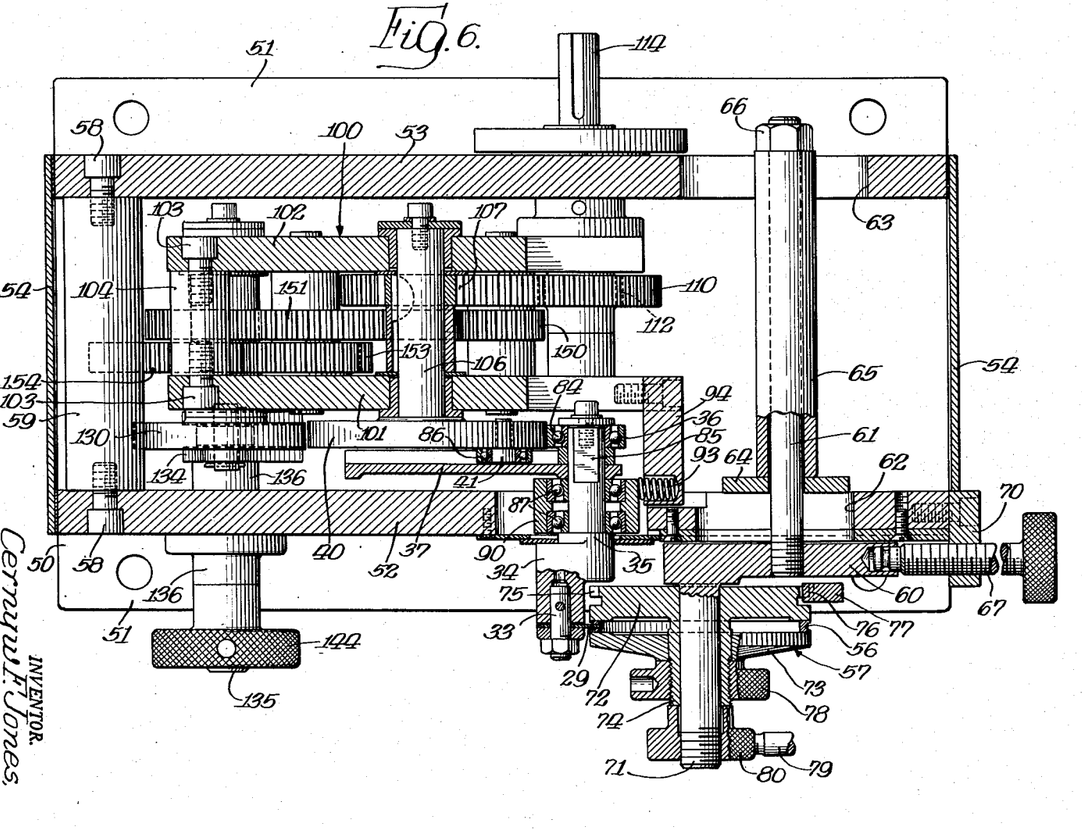
Fig. 6 is a horizontal sectional view taken substantially on the line 6—6 of Fig. 5.

The slide 60, at its opposite end, carries a post 71, on which an indexing disk 72 is mounted. The work piece 56 is adapted to be clamped against the front face of the indexing disk 72 by means of a clamping disk 73 adapted to be moved into clamping engagement with the work piece 56 by a nut 78 threaded on a sleeve 74 extending forwardly from the indexing disk 72 about the post 71. Thus, by tightening the nut 78, the work piece 56 may be tightly clamped between the indexing disk 72 and the clamping disk 73.

Since it is desired to be able to cut slots in the work piece at uniformly spaced intervals about the circumference of the work piece, the indexing disk 72 is provided with a series of peripheral notches 75 adapted to cooperate with a tooth 76 formed on an indexing lever 77 carried on the slide 60. When the tooth 76 is seated in one of the notches 75 the indexing disk is adapted to be clamped against the slide 60 to hold it in fixed position. For this purpose, a nut 80 provided with a handle 79 is threaded on the front end of the post 71 and bears against the sleeve 74 integral with the indexing disk 72 to force the indexing disk into clamping engagement with the slide 60.

The indexing lever 77 is pivotally supported on the slide 60 by means of a pin 81, and a torsion spring 82 is mounted on the pin 81 and bears at one end against the slide 60 and at its other end against the lever 77, tending to swing the lever toward the indexing disk and thus hold the tooth 76 in one of the notches 75. When it is desired to cut slots in work pieces of different diameters, indexing disks and clamping disks of different sizes are employed, both of these members preferably being substantially equal in diameter to the work piece. When different diameters of indexing disks are employed, the indexing lever 77 will require adjustment. For this purpose, the pin 81 pivotally supporting the indexing lever 77 extends through a slot 83 formed in the slide 60 and extending longitudinally thereof, so that the pivotal support for the indexing lever may be adjusted to permit the indexing lever to assume a suitable position relative to the indexing disk.

Figures 7, 9:
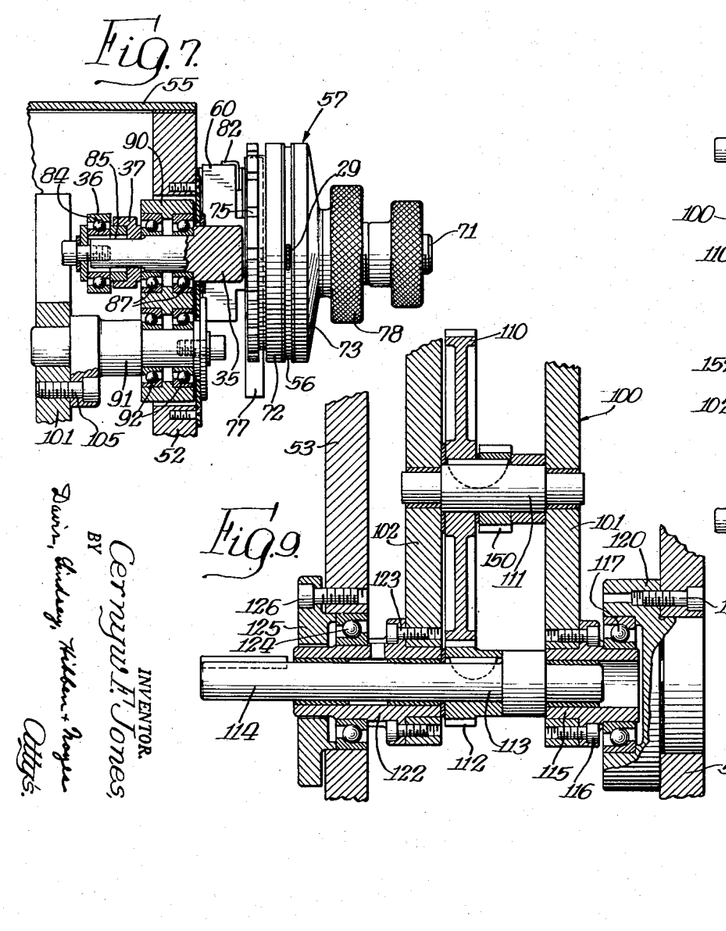
Fig. 7 is a fragmentary vertical sectional view taken substantially on the line 7—7 of Fig. 5.
Fig. 9 is a fragmentary sectional view taken substantially on the line 9—9 of Fig. 5.

The tool post 35, the movement of which has heretofore been described in connection with the cutting action of the tool 29, is consrtucted and supported as shown in Figs. 6 and 7. Thus, the roller 36 is carried on the inner end of the tool post 35 by means of an anti-friction bearing 84, and the rocking lever 37 is mounted adjacent the roller 36. The tool post 35 is flattened on opposite sides, as at 85, and the lever 37 is apertured to conform to the flattened form of the tool post, so that the two are held together for rotation. The lever 37 is channel-shaped in cross section so that a slot is provided therein, and the crank pin 41 is provided with a roller 86 positioned for movement within the slot provided by the channel.

The tool post 35 is supported intermediate its ends, that is, between the lever 37 and the offset portion 34, by anti-friction bearings 87 mounted in an arm 90. The arm 90 is mounted for swinging movement on a pivotal support 91 with anti-friction bearings 92 interposed between the pivotal support 91 and the arm 90. The swinging movement of the arm 90 on its pivotal support thus provides for the reciprocatory movement of the cutter toward and from the work while the cutter is being rocked by the crank pin 41 and the rocking lever 37. The roller 36 is held in engagement with the periphery of the cam member 40 by means which is herein illustrated as comprising a spring 93 (see Fig. 6) mounted in a bracket 94.

As heretofore mentioned, the machine includes means for feeding the cutter into the work and for withdrawing it therefrom at the completion of a cutting operation. Such feed is, of course, superimposed on the reciprocatory and rocking movement of the cutter. The feeding movement is accomplished by providing a gear box, indicated generally at 100 and constituting a part of the frame structure, which is pivotally mounted in the main frame of the machine, so that swinging movement of the gear box will feed the cutter into the work. The gear box 100 comprises a front wall 101 and a rear wall 102 which are held in spaced relation to each other by various shafts mounted therein and by bolts 103 (see Figs. 5 and 6) extending through the front and rear walls 101 and 102 and threaded into a spacing member 104, the latter preferably being mounted at one corner of the front and rear walls 101 and 102. Since the feeding movement is superimposed on the reciprocatory movement of the cutter, provided by the arm 90, the pivotal support 91 for the arm 90 is carried on the front wall 101 of the gear box, as shown in Fig. 7, and is rigidly secured thereto as by a bolt 105. Also, the bracket 94 which supports the spring 93 is carried on the front wall 101 of the gear box, as shown in Fig. 6, so that the pressure exerted by the spring 93 to hold the roller 36 against the periphery of the cam member 40 is substantially uniform throughout the feeding movement.

The cam member 40 is adapted to be power driven and, to this end, is rigidly mounted in front of the front wall 101 of the gear box on a shaft 106 journaled in both the front and rear walls 101 and 102. The shaft 106 also has rigidly secured thereto a pinion 107 located within the gear box and meshing with a relatively large idler gear 110. The idler gear 110 is keyed to a shaft 111 (see Figs. 5 and 9) journaled in the gear box walls. The idler gear 110 also meshes with a drive pinion 112 keyed to a drive shaft 113. The drive shaft 113 extends rearwardly through the rear wall 102 of the gear box as well as the rear wall 53 of the main frame and is adapted, at its rear end, indicated at 114, to receive a driving member, such as a pulley (not shown), adapted to be connected to a source of power.

The axis of the drive shaft 113 also is the axis about which the gear box 100 swings to effect feeding movement of the cutter. To this end, the drive shaft 113, at its front end, is journaled in a sleeve 115 (see Fig. 9) which is rigidly secured to the front wall 101 of the gear box as by bolts 116 and which is journaled by means of an anti-friction bearing 117 in a flange member 120 rigidly secured to the front wall 52 of the main frame as by bolts 121. The rear end of the drive shaft 113 is journaled in a sleeve 122 rigidly secured to the rear wall 102 of the gear box, as by bolts 123, and the sleeve 122 is journaled in an anti-friction bearing 124 carried by a member 125 rigidly secured to the rear wall 53 of the main frame, as by bolts 126. By making the axis of the drive shaft 113 coincident with the pivotal axis of the gear box 101, the drive connection for the shaft 113 is facilitated.

Figure 5:
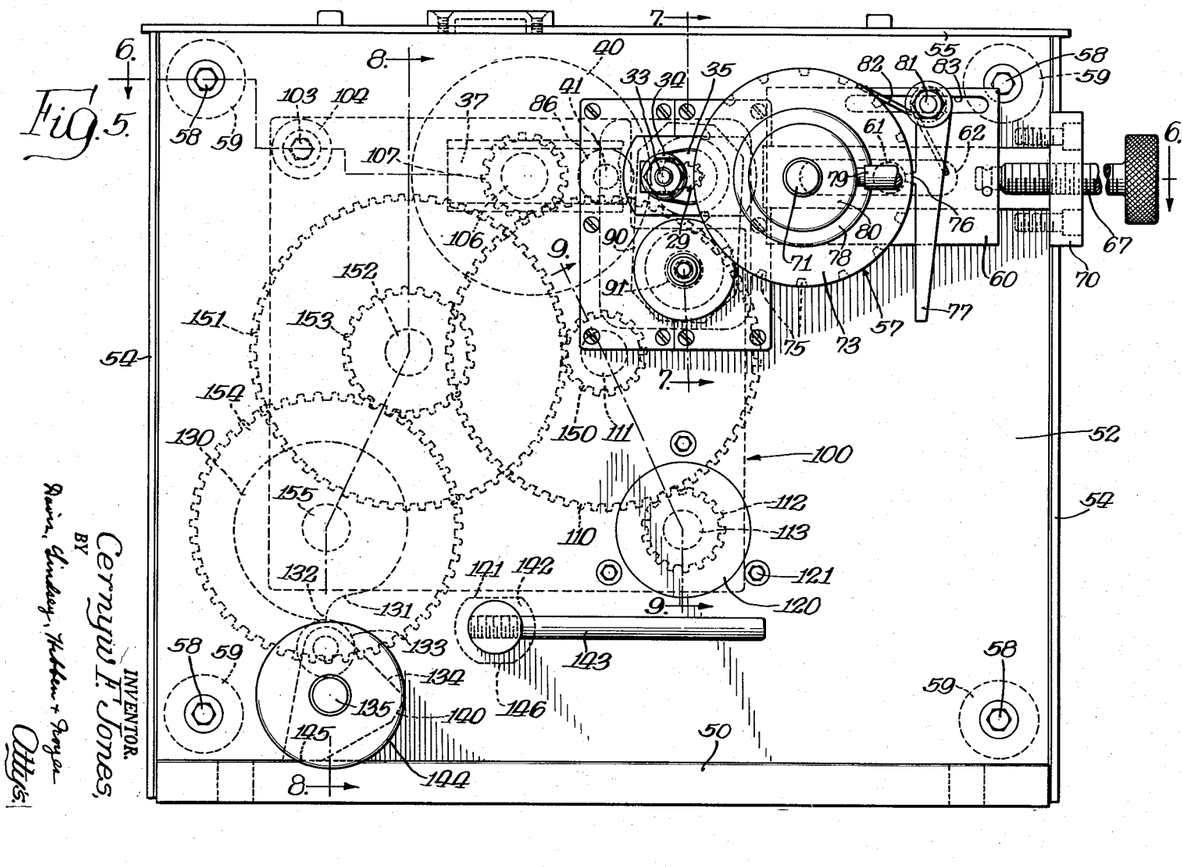
Fig. 5 is a side elevational view of the slotting machine.
Figure 8:
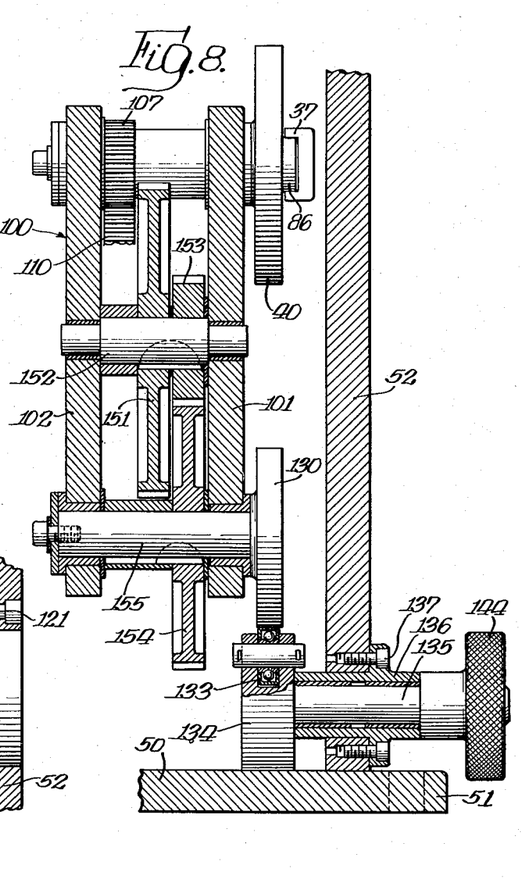
Fig. 8 is a fragmentary vertical sectional view taken substantially on the line 8—8 of Fig. 5.

To swing the gear box 101 about its axis to effect a feeding movement of the cutter, cam means is provided which is herein illustrated as a cam member 130 (see Figs. 5, 6 and 8). The cam member 130 has a peripheral cam surface gradually increasing from a low point, indicated at 131 (see Fig. 5), around the cam to a high point, indicated at 132, and then abruptly back to the low point 131. The peripheral cam surface of the cam member 130 coacts with a roller 133 mounted in a pivoted support 134. The support 134 is pivotally supported by means of a shaft 135 journaled in a sleeve 136 rigidly secured to the front wall 52 of the main frame, as by bolts 137.

The cam member 130 is power driven and rotates in a clockwise direction, as viewed in Fig. 5, and the weight of the left-hand end of the gear box as viewed in that figure is carried by the cam member 130 resting on the roller 133. As the cam rotates in the clockwise direction, the peripheral cam surface gradually lifts the left end of the gear box, swinging it about the pivotal axis of the drive shaft 113 and causing the cutter 29, which is positioned more or less directly above the pivotal axis 113, to move toward the right in cutting engagement with the work until a cut of the desired depth is made, such depth being determined by the rise of the cam member 113 from the low point 131 to the high point 132.

When the high point 132 of the cam member 130 passes over the roller 133 and beyond the dead center position, there is a camming action, due to the weight of the gear box on the roller 133, tending to swing the pivoted support 134 clockwise about the axis of its shaft 135. Such swinging movement will be limited by a flat surface 140 formed on the pivoted support 134 and adapted to engage the base 50. When the pivoted support 134 has been swung in this manner, the roller 133 will be moved out of the way of the cam member 130 and the gear box is permitted to fall by swinging about the drive shaft 113 until the lower edge of the front wall 101 contacts a flattened surface 141 (see Fig. 5) formed on a stop member 142 rotatably mounted in the front wall 52 of the main frame. The stop member 142 is provided with a handle 143 by which the stop member may be manually rotated. When the gear box 100 drops into contact with the flat surface 141 on the stop member 142 and the roller 133 has been moved away from the cam member 130 by the swinging movement of the pivoted support 134, the cam member remains out of engagement with the roller 133 and will produce no further feeding movement until the parts are returned to operative position.

To return the parts to such position, the shaft 135 is rotated by a knob 144 secured to the outer end of the shaft 135 in front of the front wall 52. Rotation of the knob 144 turns the pivoted support 134 to bring the roller 133 back toward operative position relative to the peripheral cam surface of the cam member 130. If the roller 133 were moved into contact with the cam surface at some point between the low and high points thereof, a large force would have to be exerted on the knob 144 to shift the roller 133 into operative position and the cutter would immediately be shifted to a position corresponding to the point of contact. To avoid the necessity of exerting such a force and to insure starting the feed at the proper point, the knob 144 is turned sufficiently to bring the roller 133 into light contact with the cam surface without moving the roller fully into operative position. The roller is then held in such contact until the high point 132 of the cam passes the roller. The roller then may be easily turned into operative position adjacent the low point 131 since the stop member 142 holds the gear box in such position that there is a slight clearance between the low point of the cam and the roller. Rotation of the cam thereupon causes the cam surface to contact the roller because of the rise of the cam, and as soon as such contact is made, feeding of the cutter is started. During contact between the cam and the roller, the pivoted support 134 is held into operative position with the surface 145 in contact with the base 50 because of the direction of rotation of the cam. Such position of the cam roller is determined by a flattened surface 145 formed on the pivoted support 134 and adapted to engage the base 50 when the cam roller 133 is in operative position. Thus, the cutter will be fed into the work by the action of the cam member 130 to form a cut of the desired depth and upon completion of such cut, the feeding movement is stopped and is rendered inoperable until the roller 133 and the cam member 130 are again placed in operative position to each other through use of the handle 143 on the stop member 142 and the knob 144 for turning the pivotal support 134 of the roller 133.

Since the end of the tool post 35, which has the cutter 29 secured thereto, closely approaches the indexing disk 72 and the clamping disk 73 at the end of a cut, as is apparent in Fig. 6, the slide 60 must be carefully adjusted to prevent the tool post from contacting the indexing disk and clamping disk. To assist in such adjustment, the stop member 142 at its side opposite the flattened side 141 is provided with a flattened surface 146 which holds the gear box and consequently the cutter 29 in the position they occupy at the end of the cut. Manual rotation of the hand lever 142 by its camming action on the gear box will lift the gear box about its pivot and when the flattened surface 146 is in contact with the gear box, the cutter 29 is held in the same position as at the end of the cut. The slide 60 may then be adjusted to provide suitable clearance between the tool post and the indexing and clamping disks.

The cam member 130 is adapted to be power driven, as heretofore mentioned, and is preferably driven from the same source of power as the cutter 29. The means for driving the cam member 130 thus is connected to the cutter drive and, in the present instance, the shaft 111 carrying the idler gear 110, which is part of the cutter drive, is provided with a pinion 150 meshing with a large idler gear 151 (see Figs. 5 and 8) keyed on a stub shaft 152 journaled in the front and rear walls 101 and 102 of the gear box. The stub shaft 152 also carries a pinion 153 meshing with a gear 154 keyed to a shaft 155 journaled in the front and rear walls 101 and 102 of the gear box. The shaft 155 projects through the front wall 101 of the gear box and carries the cam member 130 on its front end. Thus, the cam member 130 is driven from the same source of power as the cam member 40 which operates the cutter 29, and the correct relation between the cutter speed, that is, the rotative movement of the cutter during rocking, and the rate of feed can thus be obtained, as well as synchronizing the cutter movements with the feed.

In operation, the work piece is clamped in the work holder 57 and the indexing lever 77 is engaged in one of the notches in the indexing disk 72. The indexing disk is also clamped at this time to the slide 60 by means of the nut 80. The slide 60, of course, is adjusted longitudinally to hold the work piece in proper relation to the cutter 29.

The main drive shaft 113 is then driven and, assuming that the cam member 130 is in operative relation with the roller 133, the drive causes rotation of the cam member 130 to swing the gear box 100 clockwise, as viewed in Fig. 5, about the axis of the drive shaft 113 to move the cutter 29 toward the work.

Operation of the drive shaft 113 also causes rotation of the cam member 40 which, through its peripheral cam surface in contact with the roller 36 on the tool post 35, causes the cutter to be reciprocated toward and from the work while simultaneously being fed in that direction. The action of the cam member 40 on the roller 36 actually causes the arm 90 to swing about its pivotal support 91 but, since the movement effected by the cam is so slight, the resultant movement of the cutter caused thereby may be said to be reciprocatory in character. At the same time, rotation of the cam member 40 causes a swinging movement of the lever 37 secured to the tool post 35 and the cutter is rocked back and forth about its axis 31. Thus, the cutter is moved into the work a few thousandths of an inch by the reciprocatory movement effected by the cam member 40 at the same time that it is swung through a cutting stroke due to the rocking movement of the cutter. On the return stroke of the cutter, the latter is swung away from the work so that the cutter clears the work during such movement. Furthermore, the gear box is gradually swung by the cam member 130 so that the cutter is moved inwardly relative to the work in addition to the reciprocatory movement imparted thereto.

When the cutter has been fed inwardly relatively to the work to the desired extent, that is, when the cam member 130 has made on rotation from the low point 131 to the high point 132, the latter exerts a camming action on the roller 133 to swing the pivotal support 134 about its supporting shaft 135. The roller 133 is then moved out of the way of the cam member 130 to render the feed inoperative, and the gear box 100 swings downwardly to rest on the flat surface 141 of the stop member 142.

The clamping nut 80 on the work support 57 is then loosened and the indexing lever 77 is swung to remove its tooth from the notch in the indexing disk. The indexing disk is rotated sufficiently to bring the next notch into position for engagement by the tooth on the indexing lever and the nut 80 is retightened to clamp the work piece in the new position to permit the cutter to cut another slot in the work piece. The knob 144 is then turned in the manner heretofore described to bring the pivoted support 134 for the roller 133 back into operative position. The feeding mechanism is thereby rendered operative and the cutter is fed into the work to cut another notch therein. This is repeated until all the notches are completed in the work piece, and at that point the work piece is removed from the work holder.

By the combined reciprocatory and rocking movement of the cutter, together with the feeding movement imparted thereto, a slot will be cut in the ring in which the ends of each slot are generally radial of the ring and, consequently, the angular extent of the slot at the outer periphery is substantially the same as the angular slot at the inner periphery. This results in a ring having a number of advantages as heretofore described.

I claim:

1. A slotting machine comprising a cutter having a series of teeth arranged in an arc about an axis, and means rotatably supporting said cutter on said axis, said means being shiftable bodily in a direction perpendicular to said axis, and mechanism for rocking said cutter and simultaneously shifting said means.

2. A slotting machine comprising a cutter having a series of teeth arranged in an arc about an axis, and means rotatably supporting said cutter on said axis, said means being movable bodily perpendicularly to said axis, and mechanism for rocking said cutter about said axis in one direction and for moving said means bodily toward and from the work during rocking in said one direction and then for rocking said cutter in the opposite direction and for moving said means bodily farther from the work and back toward the work during rocking in said opposite direction.

3. A slotting machine comprising a cutter having a series of teeth arranged in an arc about an axis and having a portion extending on the opposite side of said axis from said teeth, a cutter support having said portion secured thereto, a member rotatably carrying said cutter support for rocking movement about said axis and mounted for shifting movement to shift said cutter, and rotatable means for rocking said cutter support and for shifting said member to simultaneously rock and shift said cutter.

4. A slotting machine comprising an elongated cutter having a series of teeth formed on one end about an axis located adjacent said end, a cutter support having the other end of said cutter secured thereto, said cutter support being mounted for rocking movement about said axis and for reciprocating movement perpendicular to said axis, and a rotatable member having rocking means thereon for effecting said rocking movement of said cutter support and reciprocating means thereon for effecting said reciprocating movement of said cutter support to simultaneously rock said cutter relative to the work and to shift said cutter toward and from the work.

5. A slotting machine comprising an elongated cutter having a series of teeth formed on one end about an axis located adjacent said end, a cutter support having the other end of said cutter secured thereto, said cutter support being mounted for rocking movement about said axis and for reciprocating movement perpendicular to said axis, and a rotatably driven cam disk having a crank connection with said cutter support for imparting rocking movement to the latter and a cam surface for imparting reciprocating movement to the cutter support to simultaneously rock said cutter relative to the work and to shift said cutter toward and from the work.

6. A slotting machine comprising an elongated cutter having a series of teeth formed on one end about an axis located adjacent said end, a cutter support having the other end of said cutter secured thereto, said cutter support being mounted for rocking movement about said axis and for reciprocating movement perpendicular to said axis, a lever carried by said cutter support, and a rotatably driven cam disk having a peripheral cam surface engaging said cutter support for reciprocating the latter and having a crank pin engaging said lever for rocking the cutter support, whereby said cutter is simultaneously rocked relative to the work and is shifted toward and from the work.

7. A slotting machine comprising an elongated cutter having a series of teeth formed on one end about an axis located adjacent said end, a cutter support having the other end of said cutter secured thereto, said cutter support being mounted for rocking movement about said axis and for reciprocating movement perpendicular to said axis, a roller mounted on said cutter support, a lever carried by said cutter support and having a slot in its free end, and a rotatably driven cam disk having a peripheral cam surface engaging said roller for reciprocating the cutter support and having a crank pin on one face operating in said slot for rocking the cutter support, whereby said cutter is simultaneously rocked relative to the work and is shifted toward and from the work.

8. A slotting machine comprising an elongated cutter having an arcuately arranged series of angularly spaced teeth formed on one end about an axis located adjacent said end, a cutter support having the other end of said cutter secured thereto, said cutter support being mounted for rocking movement about said axis and for reciprocating movement perpendicular to said axis, and rotatably driven cam means for reciprocating said cutter support and having a crank connection therewith for rocking the cutter support to simultaneously rock the cutter relative to the work and to reciprocate it toward and from the work, the angular extent of the rocking movement being greater than the angle between the teeth whereby the teeth will clear the work at the end of the rocking movement.

9. A slotting machine comprising an elongated cutter having an arcuately arranged series of angularly spaced teeth formed on one end about an axis located adjacent said end, a cutter support having the other end of said cutter secured thereto, said cutter support being mounted for rocking movement about said axis and for reciprocating movement perpendicular to said axis, said rocking movement effecting a cutting stroke of the cutter and a return stroke, and a rotatably driven combined cam and crank means for simultaneously rocking and reciprocating said cutter support, said combined cam and crank means being arranged to move the cutter from an initial position toward the work and back to said initial position during said cutting stroke and from said initial position away from the work and back to said initial position during said return stroke.

10. A slotting machine comprising a cutting tool having an arcuately arranged series of teeth formed on one end thereof about an axis adjacent said end, a cutter support comprising a tool post having the other end of the tool secured thereto and an arm rotatably supporting said tool post on such axis and pivotally mounted on an axis spaced from the first-mentioned axis, and rotatably driven cam means for swinging said tool post in said arm to rock the tool about the axis of its teeth and for swinging the tool post and arm about the pivotal axis of the latter to reciprocate the tool toward and from the work.

11. A slotting machine comprising a cutting tool having an arcuately arranged series of teeth formed on one end thereof about an axis adjacent said end, a cutter support comprising a tool post having an offset portion with the other end of the tool secured thereto, and an arm rotatably supporting said tool post on said axis whereby the tool is supported for rocking movement about the axis of the teeth, said arm being pivotally mounted on an axis spaced from the first-mentioned axis whereby the tool is supported for reciprocating movement toward and from the work, and combined cam and crank means for rocking said tool post in said arm and for pivoting said tool post and arm about the axis of the latter.

12. A slotting machine comprising a cutting tool having a series of teeth arranged in an arc about an axis located at one end of the tool, a cutter support comprising a tool post having an offset portion at one end to which the other end of the tool is secured, and an arm rotatably supporting said tool post intermediate its ends on said axis, said arm being pivotally mounted on an axis spaced from the first-mentioned axis, said tool post having a roller and a lever mounted on the other end thereof, and a rotatably driven cam member having a peripheral cam surface engaging said roller for pivoting said arm about its pivotal axis and thereby reciprocating the tool toward and from the work and having a crank pin engaging said lever for rocking said tool post and thereby rocking the tool about the axis of its teeth.

13. A slotting machine comprising a main frame, a work support mounted on said main frame, a gear box pivotally mounted in said main frame, an arm pivotally mounted on said gear box, a tool post rotatably mounted on said arm, a cutter carried by said tool post, combined cam and crank means carried by said gear box for rocking said tool post to rock the cutter relative to the work and for swinging said arm to reciprocate the cutter toward and from the work, and feeding means carried by said gear box for swinging the latter to feed the cutter into the work.

14. A slotting machine comprising a main frame, a work support mounted on said main frame, a gear box pivotally mounted in said main frame, an arm pivotally mounted on said gear box, a tool post rotatably mounted on said arm, a cutter carried by said tool post, combined cam and crank means carried by said gear box for rocking said tool post to rock the cutter relative to the work and for swinging said arm to reciprocate the cutter toward and from the work, feeding means carried by said gear box for swinging the latter to feed the cutter into the work, and drive gearing carried by said gear box for driving said cam and crank means and said feeding means.

15. A slotting machine comprising a main frame, a work support mounted on said main frame, a gear box pivotally mounted in said main frame, an arm pivotally mounted on said gear box, a tool post rotatably mounted on said arm, a cutter carried by said tool post, combined cam and crank means carried by said gear box for rocking said tool post to rock the cutter relative to the work and for swinging said arm to reciprocate the cutter toward and from the work, feeding means carried by said gear box for swinging the latter to feed the cutter into the work, a drive shaft mounted in said main frame and comprising the pivotal support for said gear box, gearing mounted in said gear box and connecting said cam and crank means with said drive shaft, and gearing mounted in said gear box and connecting said feeding means with said drive shaft.

16. A slotting machine comprising a main frame, a work support mounted on said main frame, a gear box pivotally mounted in said main frame, an arm pivotally mounted on said gear box, a tool post mounted on said arm and carrying a roller and a lever, a cutter mounted on said tool post, a rotatably driven cam member carried by said gear box and having a peripheral cam surface engaging said roller for swinging said arm to reciprocate the cutter toward and from the work, said cam member having a crank pin engaging said lever for imparting rocking movement to said tool post to rock the cutter relative to the work, feeding means carried by said gear box for swinging the latter to feed the cutter into the work, and means mounted on said gear box and engaging said arm for holding said roller in engagement with said cam surface with substantially uniform pressure throughout the feeding movement.

17. A slotting machine comprising a main frame, a work support mounted on said main frame, a gear box pivotally mounted in said main frame, an arm pivotally mounted on said gear box, a tool post rotatably mounted on said arm, a cutter carried by said tool post, combined cam and crank means carried by said gear box for rocking said tool post to rork the cutter relative to the work and for swinging said arm to reciprocate the cutter toward and from the work, and feeding means for swinging the gear box to feed the cutter into the work, said feeding means comprising a rotatably driven cam carried by said gear box, and a roller engaging said cam and carried by said main frame.

18. A slotting machine comprising a main frame, a work support mounted on said main frame, a gear box pivotally mounted in said main frame, an arm pivotally mounted on said gear box, a tool post rotatably mounted on said arm, a cutter carried by said tool post, combined cam and crank means carried by said gear box for rocking said tool post to rock the cutter relative to the work and for swinging said arm to reciprocate the cutter toward and from the work, and feeding means for swinging the gear box to feed the cutter into the work, said feeding means comprising a rotatably driven cam having a peripheral cam surface gradually increasing from a low point around the cam to a high point and abruptly back to the low point, a roller engaging said cam, a pivoted support mounted on the main frame and carrying said roller, the high point on said cam being adapted as it passes said roller to swing the pivoted support to an out-of-the-way position to prevent re-engagement of said cam with the roller, and stop means for holding said gear box in an inoperative position when said pivoted support is swung to its out-of-the-way position.

19. A slotting machine comprising a main frame, a work support mounted on said main frame, a gear box pivotally mounted in said main frame, cutter supporting means carried by said gear box, a cutter carried by said means, drive means carried by said gear box for actuating said cutter supporting means, feeding means for swinging said gear box to feed the cutter into the work, said feeding means including a cam, means for driving said cam, a roller coacting with said cam, and a pivoted support mounted on said main frame and carrying said roller, said cam being adapted to swing said pivoted support to an out-of-the-way position at the end of the feeding movement to hold the roller out of engagement with the cam, stop means for supporting said gear box when said roller is out of engagement with the cam, and manually operable means connected to said pivoted support for swinging the latter to its operative position to reengage said roller with said cam when the cam is so positioned relative to the roller as to initiate to full feeding movement.

20. A slotting machine comprising a main frame, a work support adjustably mounted on said main frame, a gear box pivotally mounted in said main frame, cutter supporting means carried by said gear box, a cutter carried by said means in spaced relation to the pivotal axis of the gear box, drive means carried by said gear box for actuating said cutter supporting means, feeding means for swinging said gear box about its pivotal axis to feed the cutter into the work, and means mounted on said main frame and manually shiftable into engagement with said gear box for supporting said gear box in a position corresponding to the position it occupies at the end of its swinging movement for feeding the cutter into a work, whereby said gear box may be held in said position and said work support may be adjusted in relation to the position of the cutter at the end of its feeding movement.

CERNYW F. JONES.

References Cited in the file of this patent
UNITED STATES PATENTS

| Number | Name | Date |
|---|---|---|
| 531,817 | Warren | Jan. 1, 1895 |
| 1,028,125 | Melling | June 4, 1912 |
| 1,285,667 | Fredman | Nov. 26, 1918 |

FOREIGN PATENTS

| Number | Country | Date |
|---|---|---|
| 17,680 | Germany | Aug. 23, 1898 |